(12) United States Patent
Takenaka

(10) Patent No.: US 10,121,098 B2
(45) Date of Patent: Nov. 6, 2018

(54) IMAGE FORMING APPARATUS HAVING PLURALITY OF PROCESSING UNITS FOR GENERATING INTERMEDIATE DATA, AND METHOD FOR CONTROLLING THE IMAGE FORMING APPARATUS

(71) Applicant: CANON KABUSHIKI KAISHA, Tokyo (JP)

(72) Inventor: Shuichi Takenaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 15/141,510

(22) Filed: Apr. 28, 2016

(65) Prior Publication Data

US 2016/0321525 A1 Nov. 3, 2016

(30) Foreign Application Priority Data

Apr. 30, 2015 (JP) .................................. 2015-093537
Feb. 23, 2016 (JP) .................................. 2016-032473

(51) Int. Cl.
*G06K 15/02* (2006.01)
*G06F 3/12* (2006.01)

(52) U.S. Cl.
CPC ....... *G06K 15/1857* (2013.01); *G06F 3/1203* (2013.01); *G06F 3/1245* (2013.01); *G06F 3/1248* (2013.01); *G06K 15/1817* (2013.01); *G06K 15/1836* (2013.01); *G06K 15/1849* (2013.01)

(58) Field of Classification Search
CPC ........... G06K 15/1857; G06K 15/1836; G06K 15/1849; G06K 15/1817; G06F 3/1245; G06F 3/1203; G06F 3/1248
USPC ...................................................... 358/1.15
See application file for complete search history.

(56) References Cited

U.S. PATENT DOCUMENTS

2008/0137135 A1* 6/2008 Takeishi ................. G06K 15/02
358/1.15
2011/0102835 A1* 5/2011 Tokumoto ............. G06F 3/1211
358/1.15

FOREIGN PATENT DOCUMENTS

| CN | 1622125 A | 6/2005 |
|---|---|---|
| CN | 1710598 A | 12/2005 |
| CN | 101998018 A | 3/2011 |
| JP | 2012-16842 A | 1/2012 |

* cited by examiner

*Primary Examiner* — Kent Yip
(74) *Attorney, Agent, or Firm* — Canon U.S.A., Inc. IP Division

(57) ABSTRACT

When the generation of intermediate data of the following page is completed before the generation of intermediate data of the preceding page, the rasterization of the intermediate data of the following page is performed after completion of the generation and rasterization of the intermediate data of the preceding page.

22 Claims, 8 Drawing Sheets

IMAGE FORMING APPARATUS HAVING PLURALITY OF PROCESSING UNITS FOR GENERATING INTERMEDIATE DATA, AND METHOD FOR CONTROLLING THE IMAGE FORMING APPARATUS

BACKGROUND

Field of the Disclosure

The present disclosure relates to a technique for generating intermediate data by using a plurality of processing units.

Description of the Related Art

In the rasterization based on print data (page description language (PDL) data) described in a page description language, intermediate data described in an intermediate language is generated based on PDL data and then the intermediate data is rasterized into a raster image. Japanese Patent Application Laid-Open No. 2012-16842 discusses a technique used by a printer mounting a multi-core central processing unit (CPU) having a plurality of processor cores to parallelly perform the rasterization on different pages. More specifically, each processor core is sequentially assigned a rasterization target page, generates intermediate data based on the PDL data of the assigned page, and then rasterizes the intermediate data to generate a raster image of the page. Then, the raster image is transmitted to a printer engine and then printed.

In a conventional printer, a plurality of processor cores performs the rasterization for respective different pages. Therefore, the conventional printer performs the following control to cause the order of pages to be printed to coincide with the order of pages of the PDL data. Even when one processor core first completes the rasterization of the following page, the one processor core waits until the other processor core completes the rasterization of the preceding page and the transmission of a raster image to a printer engine, and then transmits a raster image of the following page to the printer engine.

More specifically, in the conventional printer, the raster image resulting from the rasterization of the following page is continuously stored in a memory until the raster image of the preceding page is generated. Therefore, the printer requires an amount of memory sufficient for storing these raster images.

SUMMARY

According to an aspect of the present invention, an image forming apparatus includes, a receiving unit configured to receive PDL data including a plurality of pages, a plurality of processing units configured to generate, on a page basis, intermediate data of the plurality of pages based on the PDL data, a rasterizing unit configured to rasterize the intermediate data of the plurality of pages generated by the plurality of processing units, and a printing unit configured to print the rasterized pages. In a case where generation of intermediate data of a following page is completed before generation of intermediate data of a preceding page, a rasterization of the intermediate data of the following page by the rasterizing unit is controlled so that the rasterization of the intermediate data of the following page is delayed until the generation and rasterization of the intermediate data of the preceding page are completed.

Further features of the present invention will become apparent from the following description of exemplary embodiments with reference to the attached drawings.

DESCRIPTION OF THE EMBODIMENTS

An image forming apparatus according to a first exemplary embodiment will be described below with reference to the accompanying drawings. According to the present exemplary embodiment, the image forming apparatus having a plurality of processing units enables performing page order control with a smaller amount of memory.

<Hardware Block Diagram of Image Forming Apparatus>

Figure 1:
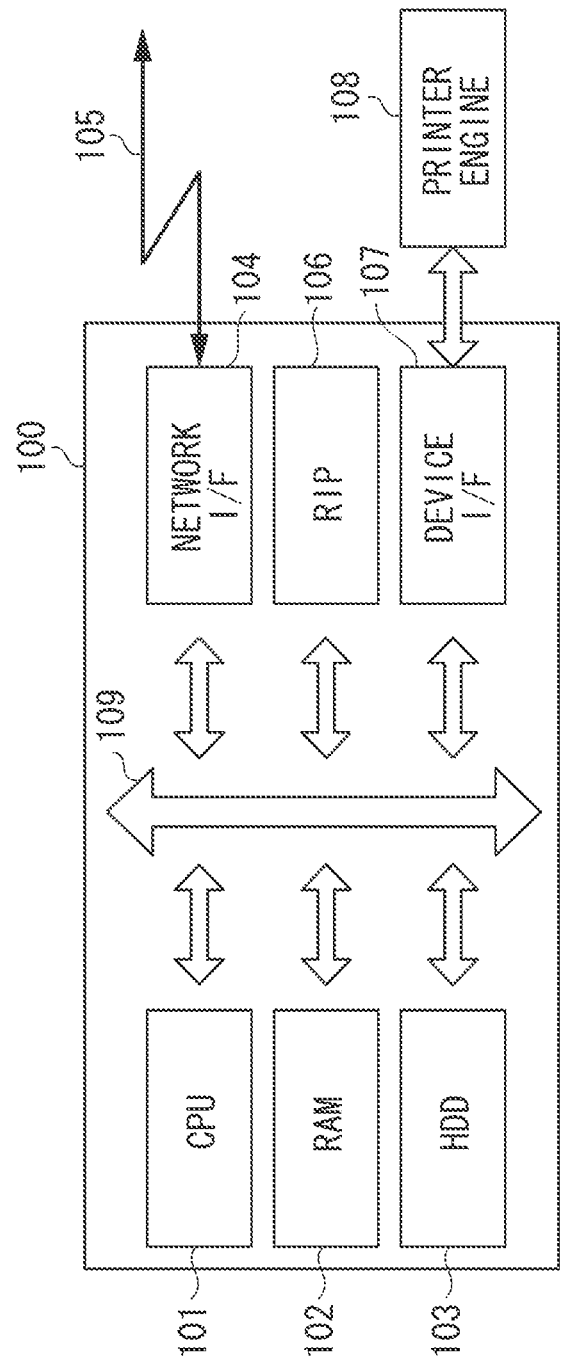
FIG. 1 illustrates a hardware configuration of an image forming apparatus.

FIG. 1 is a hardware block diagram illustrating a configuration of the image forming apparatus (printing apparatus) according to the present exemplary embodiment. Referring to FIG. 1, a controller unit 100 includes a central processing unit (CPU) 101, a random access memory (RAM) 102, a read only memory (ROM) (not illustrated), a hard disk drive (HDD) 103, a network interface (I/F) 104, a raster image processor (RIP) 106, and a device I/F 107. The controller unit 100 receives print data (PDL data) described in the PDL from an external apparatus (for example, a host personal computer (PC)) connected with a network 105 such as a local area network (LAN) via the network I/F 104. The controller unit 100 also connects with a printer engine 108 via the device I/F 107 to control input and output of image signals and device information.

The CPU 101 loads a program stored in the HDD 103 into the RAM 102 and then executes it. The CPU 101 further totally controls each device connected to a system bus 109 according to the program. The CPU 101, a multi-core CPU having a plurality of processor cores, parallelly performs intermediate data (display list (DL)) generation (conversion) based on PDL data on a multi-thread basis. The CPU 101 converts PDL data into a DL having a common format in order to use subsequent processing in common even when there are various types of PDL data. Multithread (described below) refers to an operation in which the respective processor cores included in the CPU 101 function as different threads. More specifically, multi-thread is equivalent to an operation in which different threads perform processing and different processor cores perform different processing. It is also possible to use a CPU capable of utilizing a technique for simulating a plurality of processor cores with one processor core by effectively using idle time of registers and pipeline circuits in the CPU, such as hyper-threading.

The RAM 102 functions as a main memory of the CPU 101, a work memory, and a memory for storing DLs (hereinafter referred to as a DL storage memory). The DL storage memory is a memory area allocated in the RAM 102, having a predetermined data size for storing DLs for a plurality of pages. A maximum value is predetermined for the data size of a DL for one page. As described below, if, during the DL generation for a certain page, the data size of the generated DL of the relevant page exceeds the maximum value, a DL thread (DL thread generation unit) once stops the DL generation and then generates a raster image based on the generated DL by using the RIP 106. Then, the DL thread deletes the generated DL to allocate a free space in the DL storage memory, compresses the generated raster image, and stores the compressed raster image, as a DL, in the allocated free space in the DL storage memory. Then, the DL thread resumes the DL generation for the relevant page. This series of processing is referred to as fall back processing. Based on the fall back processing, the DL thread prevents the DL data size for one page from exceeding the predetermined maximum value. A part of the RAM 102 also functions as a buffer 204 (described below). The HDD 103 is used to store mass data on a temporarily or on a long-term basis.

The RIP 106, also referred to as a rasterizer, performs the raster image generation (rasterization into bit map data) based on a DL generated by the CPU 101. The RIP 106 sequentially receives, on a page basis, DLs transmitted in the order of pages by the CPU 101 and then rasterizes the DLs in the order of pages, as described below. The RIP 106 performs the DL rasterization in parallel with the DL generation by the CPU 101 on a page basis. More specifically, in parallel with the DL generation for the subsequent page (following page) by the CPU 101, the RIP 106 performs the DL rasterization on the previous page (preceding page). A raster image generated through the DL rasterization is sent to the printer engine 108.

The printer engine 108 includes an engine I/F (not illustrated) for sequentially converting each of raster images transmitted from the controller unit 100 into an image signal. The printer engine 108 is a printing unit for printing an image on a sheet such as paper based on the image signal. The printing process of the printer engine 108 may be an electrophotographic process and an ink-jet process, and is not limited to a certain process.

<Software Module Diagram of Image Forming Apparatus>

Figure 2:
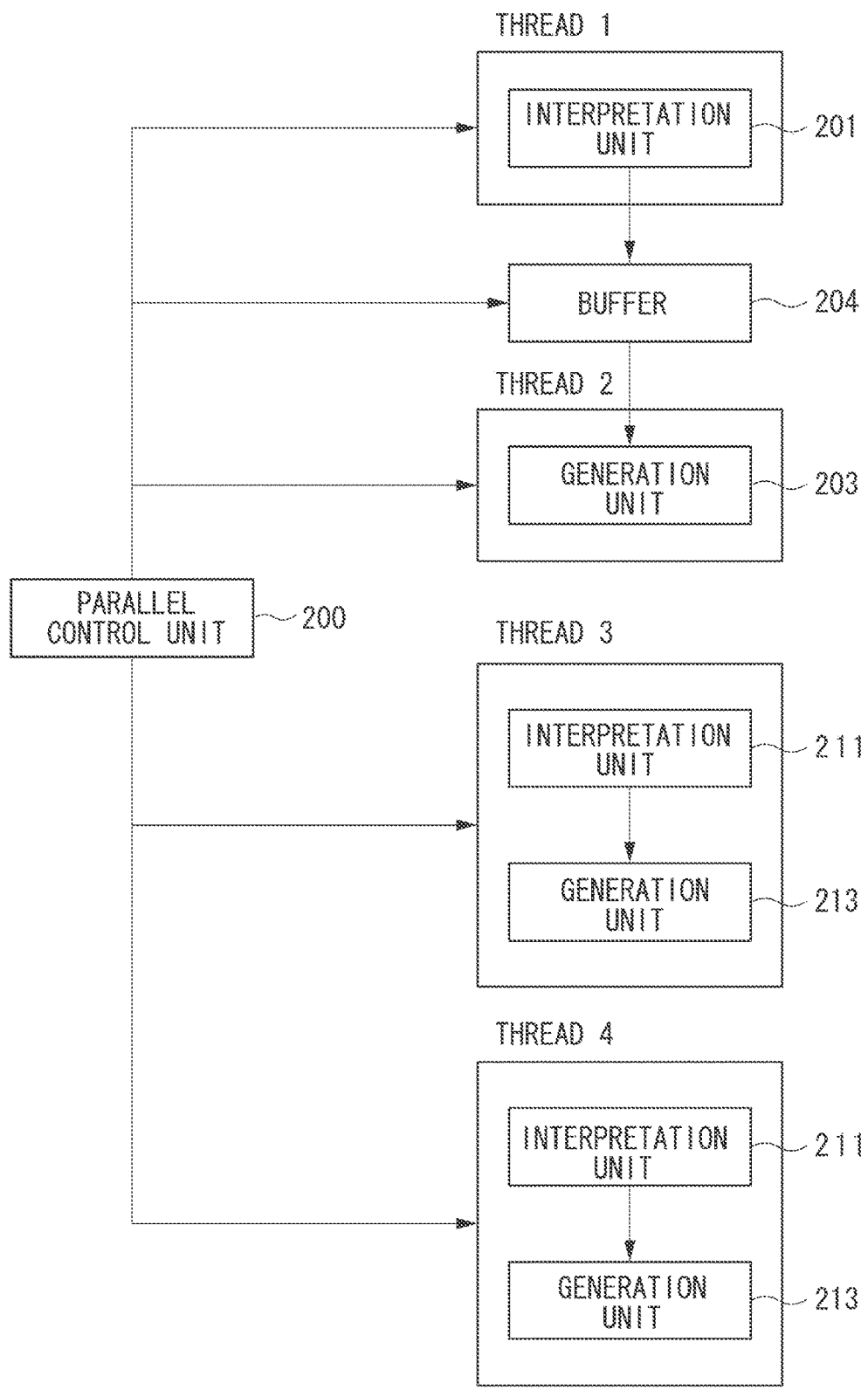
FIG. 2 illustrates a software configuration of the image forming apparatus.

FIG. 2 illustrates a software configuration of the image forming apparatus according to the present exemplary embodiment. Each software module illustrated in FIG. 2 is implemented when the above-described program stored in the HDD 103 is loaded into the RAM 102 and then executed by the CPU 101.

A parallel control unit 200 divides image forming processing for PDL data into predetermined units, and assigns respective units of image forming processing to a plurality of threads. Processing in predetermined units includes the processing of the DL generation for one page based on the PDL data, the processing of the PDL data interpretation for one object, and the processing of the DL generation based on the result of the PDL data interpretation for one object. The parallel control unit 200 according to the present exemplary embodiment may initialize the buffer 204, and assign to a thread 1 the processing of the PDL data interpretation for one object and the processing of storing the interpretation result in the buffer 204. More specifically, the thread 1 is a pipeline PDL thread which functions as an interpretation unit 201. The parallel control unit 200 may assign to a thread 2 the processing of the DL generation based on the result of the PDL data interpretation for one object stored in the buffer 204. More specifically, the thread 2 is a pipeline DL thread which functions as a generation unit 203. The parallel control unit 200 may assign to a thread 3 the processing of the PDL data interpretation for all objects included in a certain page and the processing of the DL generation based on the interpretation result. More specifically, the thread 3 is a page DL thread which functions as an interpretation unit 211 and a generation unit 213. The parallel control unit 200 may assign to a thread 4 the processing of the PDL data interpretation for all objects included in another page and the processing of the DL generation based on the interpretation result. More specifically, the thread 4 also is a page DL thread which functions as the interpretation unit 211 and the generation unit 213. The thread 4 differs from the thread 3 in the DL generation target page.

The term "object" refers to a text object including a plurality of characters, a line segment object determined by specifying the coordinates of both ends of a line segment, or a bit map object.

In the present exemplary embodiment, the interpretation unit 201 performs the processing of the PDL data interpretation for objects. The interpretation unit 201 interprets the PDL data for each object and then stores the interpretation result in a work memory. The result of interpretation for one object included in the PDL data is temporarily stored in the work memory, and then overwritten by the result of the PDL data interpretation for one object subsequently performed.

Meanwhile, the interpretation unit 211 interprets the PDL data and then stores the interpretation result in the work memory similar to the interpretation unit 201, and the interpretation unit 211 subsequently transmits the interpretation result to the buffer 204.

In the present exemplary embodiment, the generation unit 203 performs the processing of the DL generation for objects based on the interpretation result. The generation unit 203 generates a DL based on the result of the PDL data interpretation. The generation unit 203 acquires the interpretation result from the work memory of the interpretation unit 201. Whereas, unlike the generation unit 203, the generation unit 213 acquires the interpretation result not from the work memory, but from the buffer 204.

Although, in the present exemplary embodiment, each software module is implemented as described above when the CPU 101 executes a program, the present invention is not limited thereto. The function of each software module may be implemented by hardware. Although the four threads 1 to 4 are illustrated in FIG. 2, one thread may perform the operation of another thread. For example, although the thread 1 serves as a pipeline DL thread in the case of pipeline parallel processing (described below), the thread 1 may serve as a page DL thread similar to the thread 3 in the case of page parallel processing. This also applies to the threads 2 and 4.

The present exemplary embodiment switches between two different types of parallel processing to achieve the improved processing speed based on parallel processing not only with print data of a plurality of pages but also with print data of only one page.

One type of parallel processing is pipeline processing in which the processing of the interpretation unit 201 and the processing of the generation unit 203 are implemented by a pipeline control unit 202 based on different threads. More specifically, for the first page, when generating a DL for one object, a thread assigned the processing of the PDL data interpretation for the object and a thread assigned the processing of the DL generation based on the interpretation result are parallelly executed through pipeline processing. More specifically, while a thread which functions as the generation unit 203 is generating a DL based on the result of the PDL data interpretation for a certain object, another thread which functions as the interpretation unit 201 interprets the PDL data of the following object. Then, the thread which functions as the generation unit 203 generates a DL based on the interpretation result by the another thread. The above-described series of processing is repeated for one page. This processing is referred to as pipeline parallel processing.

For each of the second and the subsequent pages, the other type of parallel processing limits the number of threads which function as the interpretation unit 211 and the generation unit 213 to one. A plurality of threads for generating respective DLs of a plurality of pages is parallelly executed on a page basis. More specifically, a certain thread generates a DL based on the PDL data of a certain page, and another thread generates a DL based on the PDL data of another page. This processing is referred to as page parallel processing.

<Overview of Switching Between Page Parallel Processing and Pipeline Parallel Processing>

In page parallel processing based on a multi-core CPU, based on the multi-page PDL data, different threads (processor cores) parallelly generate DLs of different pages, and therefore effects of the processing speed improvement through multi-threaded parallel processing can be obtained. On the other hand, in page parallel processing performed by the multi-core CPU on the single-page PDL data, a certain thread (processor core) performs the DL generation based on the PDL data of the first page. However, each of the remaining threads (processor cores) enters the idle state in which the relevant thread performs neither the PDL data interpretation nor the DL generation, and therefore effects of multi-threaded (multi-core-based) parallel processing cannot be obtained for the DL generation based on the single-page PDL data.

Figure 3:
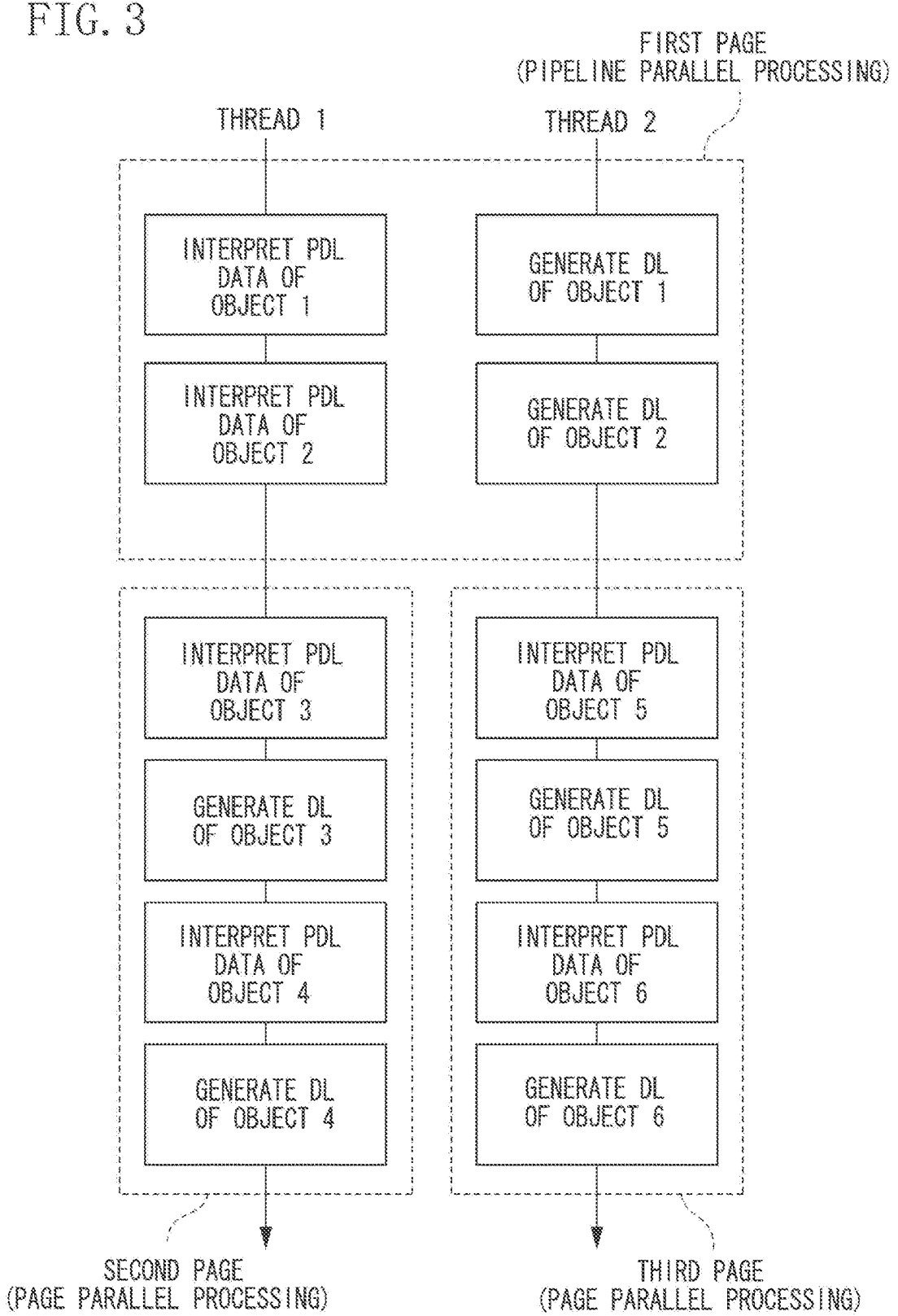
FIG. 3 is a schematic view illustrating pipeline parallel processing and page parallel processing.

In the present exemplary embodiment, therefore, the DL generation is performed on the first page of the PDL data through pipeline parallel processing, and the DL generation is performed on the second and subsequent pages thereof through page parallel processing. Thus, effects of multi-threaded parallel processing can be obtained not only with the multi-page PDL data but also with the single-page PDL data. FIG. 3 is a conceptual view illustrating this processing.

Pipeline parallel processing is performed as processing for the first page. For example, when objects 1 and 2 are included in the PDL data of the first page, the thread 1 (processor core 1) interprets the PDL data of the object 1, and the thread 2 (processor core 2) subsequently generates a DL of the object 1 based on the interpretation result. During the DL generation, the thread 1 interprets the PDL data of the object 2, and the thread 2 that has generated a DL of the object 1 generates a DL of the object 2 based on the interpretation result. Thus, the processing of respective threads can be parallelly performed, achieving the processing speed improvement for the DL generation for the first page.

Page parallel processing is performed in processing for the second and the third pages. For example, when the objects 3 and 4 are included in the PDL data of the second page, the thread 1 subsequently performs the PDL data interpretation and the DL generation for the object 3. This also applies to the object 4. Thus, a DL of the second page is generated. On the other hand, for example, when the objects 5 and 6 are included in the PDL data of the third page, the thread 2 subsequently performs the PDL data interpretation and the DL generation for the object 5. This also applies to the object 6. Thus, a DL of the third page is generated. The processing of respective threads can be parallelly performed on a page basis in this way, achieving the processing speed improvement in the DL generation for the second and the third pages. Although pipeline parallel processing may also be applied to the second and the third pages similar to the first page, in the present exemplary embodiment such processing is not performed because of the following reason. Since multi-threaded pipeline parallel processing requires communication between threads, the communication cost in pipeline parallel processing is larger than that in page parallel processing.

<Flow of Parallel Processing Switching Control>

A control flow for switching between page parallel processing and pipeline parallel processing will be described below with reference to the flowchart illustrated in FIG. 4. This control flow is performed by the parallel control unit 200 when a thread A receives the PDL data from an external apparatus via the network I/F 104.

In step S401, the parallel control unit 200 performs initialization processing. More specifically, the parallel control unit 200 manages the DL generation target page number and the DL transmission target page number, and sets both page numbers to 1. The parallel control unit 200 further activates a plurality of threads corresponding to the number of processor cores of the multi-core CPU. The parallel control unit 200 further allocates the buffer 204. For example, when there are two core CPUs, two different threads are activated. In the subsequent processing, the parallel control unit 200 sets an affinity mask so that the respective activated threads are executed by different processor cores.

In step S403, the parallel control unit 200 determines whether the DL generation target page number is 1, i.e., whether or not the DL generation target is the first page. When the DL generation target page number is 1 (YES in step S403), then in step S404 and subsequent steps, the parallel control unit 200 performs the DL generation and transmission on the first page through pipeline parallel processing. The pipeline parallel processing is as described above with reference to FIG. 3. On the other hand, when the DL generation target page number is not 1 (NO in step S403), then in step S410 and subsequent steps, the parallel control unit 200 performs the DL generation and transmission on the second and subsequent pages through page parallel processing. The first page is a predetermined page to be handled differently from the second and subsequent pages, and the second and subsequent pages are pages other than the predetermined page. The parallel control unit 200 is a generation control unit for controlling the parallel processing method depending on whether or not the DL generation target page is the predetermined page.

Processing in step S404 and subsequent steps for pipeline parallel processing will be described below.

In step S404, the parallel control unit 200 instructs a plurality of the activated threads to cooperatively perform pipeline parallel processing on the PDL data of the DL generation target page number. For example, the parallel control unit 200 instructs the thread 1 to perform the processing of the PDL data interpretation for objects out of pipeline parallel processing. At this time, the thread 1 functions as the interpretation unit 201. Meanwhile, the parallel control unit 200 instructs the thread 2 to perform the processing of the DL generation for objects based on the result of the PDL data interpretation for the objects out of pipeline parallel processing. At this time, the thread 2 functions as the generation unit 203.

In step S405, the parallel control unit 200 increments the DL generation target page number by one to set the second page as the DL generation target page. As described below, the parallel control unit 200 instructs the generation unit 203 to allocate a memory area having the maximum value of the DL data size for one page in the DL storage memory.

In step S406, the parallel control unit 200 determines whether a DL generation completion notification for the first page has been received from a thread currently performing pipeline processing. When the relevant notification has been received (YES in step S406), the processing proceeds to step S407. The relevant completion notification includes the memory address for storing the DL of the first page. The relevant completion notification also includes the page number of the generated DL, which is "first page" in this case. On the other hand, when the relevant notification has not been received (NO in step S406), the parallel control unit 200 waits for reception of the DL generation completion notification for the first page. The reason why the parallel control unit 200 waits for the relevant notification only for the first page is to improve the processing efficiency for the first page by not performing processing for the following page during pipeline parallel processing for the first page.

In step S407, the parallel control unit 200 transmits the DL with the transmission target page number (i.e., the DL of the first page) to the RIP 106. The transmitted DL is rasterized by the RIP 106. More specifically, the parallel control unit 200 notifies the RIP 106 of the memory address included in the relevant completion notification. The RIP 106 acquires the DL stored in the memory address and then rasterizes it. Then, upon detection of completion of the DL rasterization for the first page, the parallel control unit 200 instructs the generation unit 203 serving as a DL thread to release the memory area allocated on the DL storage memory. The generated raster image is sent to the printer engine 108 and then printed on paper.

In step S408, the parallel control unit 200 increments the transmission target page number by one to set the second page as the DL transmission target page. Then, the processing proceeds to step S409.

Page parallel processing in step S410 and subsequent steps will be described below.

In step S410, the parallel control unit 200 repeats steps S411 to S413 until there is no thread (empty thread) to which no processing is assigned.

In step S411, the parallel control unit 200 determines whether it has instructed relevant threads to perform the processing of the DL generation through page parallel processing for all pages included in the PDL data. When the parallel control unit 200 has instructed relevant threads to perform the processing of the DL generation for all pages (YES in step S411), the processing exits the loop in step S410 and proceeds to step S414. On the other hand, when the parallel control unit 200 has not instructed relevant threads to perform the relevant processing for all pages (NO in step S411), the processing proceeds to step S412. In addition to the processing in step S411, the parallel control unit 200 may calculate the total size of DLs untransmitted to the RIP 106 (unrasterized DLs), out of DLs for pages generated so far. When the total size is smaller than a threshold value (NO in step S411), the processing may proceed to step S412. On the other hand, when the total size is equal to or greater than the threshold value (YES in step S411), the processing may proceed to step S414. By restraining the DL generation with reference to the total size of untransmitted DLs in this way, it is possible to prevent the shortage of the DL storage memory and buffer overflow even when the DL generation for a page with a smaller page number is remarkably delayed and the DL generation for another page (a page with a larger page number than the relevant smaller page number) is performed before the DL generation for the page with the relevant smaller page number. This control may be performed based not on the total size of generated and unrasterized DLs but on the number of pages of generated and unrasterized DLs. For example, when the number of pages of generated and unrasterized DLs is smaller than a threshold value (NO in step S411), the processing proceeds to step S412. On the other hand, when the relevant number is equal to or greater than the threshold value (YES in step S411), the processing proceeds to step S414. Alternatively, the parallel control unit 200 determines whether the free capacity of the DL storage memory is sufficient for allocating a memory area having the maximum value of the DL data size for one page. More specifically, the parallel control unit 200 determines whether the relevant free capacity is equal to or greater than a predetermined threshold value (maximum value). When the relevant free capacity is sufficient for allocating the relevant memory area (NO in step S411), the processing proceeds to step S412. On the other hand, when the relevant free capacity is not sufficient (YES in step S411), the processing proceeds to step S414. The relevant free capacity refers to the capacity of a usable or released memory area in the DL storage memory, and can be obtained as follows. More specifically, the relevant free capacity is obtained by subtracting "the total size of the memory area allocated for generated and unrasterized DLs on a page basis" from the predetermined data size pre-allocated as the DL storage memory. Instead of "the total size of the memory area allocated for generated and unrasterized DLs on a page basis", "the total size of generated and unrasterized DLs" may be used.

In step S412, the parallel control unit 200 assigns to an empty thread the processing of the DL generation for the page with the DL generation target page number to perform the relevant processing through page parallel processing. More specifically, the thread assigned the processing of the DL generation performs the PDL data interpretation for each object included in the page and performs the DL generation based on the interpretation result. Performing processing in this way enables parallelly performing the processing of the DL generation on a page basis, making it possible to quickly generate DLs of a plurality of pages included in the PDL data. For example, when the thread 1 is an empty thread, the thread 1 functions as the interpretation unit 211 and the generation unit 213. This also applies to a case where the thread 2 is an empty thread. As described below, the parallel control unit 200 instructs the generation unit 213 to allocate a memory area having the maximum value of the DL data size of one page on the DL storage memory.

In step S413, the parallel control unit 200 increments the DL generation target page number by one to set the next page as the DL generation target page.

This completes descriptions of the loop processing.

In step S414, the parallel control unit 200 determines whether the DL generation completion notification has been received from the thread currently performing page parallel processing. When the relevant notification has been received (YES in step S414), then in step S415, the parallel control unit 200 transmits the generated and untransmitted DL to the RIP 106. On the other hand, when the relevant notification has not been received (NO in step S414), the processing proceeds to step S409. The relevant completion notification includes the storage destination memory address and the page number (for example, the second page, the third page, or the like) of the generated DL. The page number is managed by the parallel control unit 200 as the page number of the generated DL.

In step S415, the parallel control unit 200 determines whether the DL generation for the transmission target page number has already been completed, based on the page number of the generated DL and the transmission target page number. More specifically, the parallel control unit 200 determines whether the generated DL can be transmitted (delivered) to the RIP 106 in the order of pages (from the starting page). The transmission target page number just indicates the page number for the DL which should be rasterized by the RIP 106 this time. When the DL generation for the transmission target page number has already been completed (YES in step S415), the processing proceeds to step S416. On the other hand, when the relevant DL generation has not been completed (NO in step S415), the processing proceeds to step S409. When the processing proceeds to step S409, the DL of the page number included in the completion notification received in step S414 remains stored in the storage destination memory. However, this storage form provides larger effects of memory saving than the storage form after the conversion (i.e., in the form of raster images).

In step S416, the parallel control unit 200 transmits the DL with the transmission target page number to the RIP 106. The transmitted DL is rasterized by the RIP 106. More specifically, the parallel control unit 200 notifies the RIP 106 of the storage destination memory address of the DL with the transmission target page number included in the completion notification acquired so far. The RIP 106 acquires the DL stored in the relevant memory address and then rasterizes it. Then, upon detection of completion of the DL rasterization for one page, the parallel control unit 200 instructs the generation unit 213 serving as a DL thread to release the memory area for the relevant page allocated on the DL storage memory.

In step S417, the parallel control unit 200 increments the transmission target page number by one to enable transmitting the generated DL to the RIP 106 in the order of pages.

The above-described processing in steps S415 to S417 is equivalent to transmission control in which the parallel control unit 200 controls the page order for the DL to be sent to the RIP 106 for rasterization. In this order control, even when the DL generation for the following page (for example, the third page) is completed before the DL generation for the page which should be transmitted in the correct order of pages (preceding page, for example, the second page), the DL transmission for the third page to the RIP 106 is suspended until the DL transmission for the preceding page (second page) is completed. More specifically, the parallel control unit 200 delays the DL rasterization for the following page. As a result, the DLs are rasterized in suitable page order, and raster images are generated. The raster images are sent to the printer engine 108 in order of generation, and pages are printed in the correct order of pages.

In step S409, the parallel control unit 200 determines whether the DL generation and the DL transmission to the RIP 106 are completed for all pages included in the PDL data. When the relevant processing is completed (YES in step S409), the processing exits this flowchart. On the other hand, when the relevant processing is not completed for all pages (NO in step S409), the processing returns to step S403.

The above-described processing enables the parallel control unit 200 to implement control for switching between page parallel processing and pipeline parallel processing.

<Pipeline PDL Thread>

Figure 5:
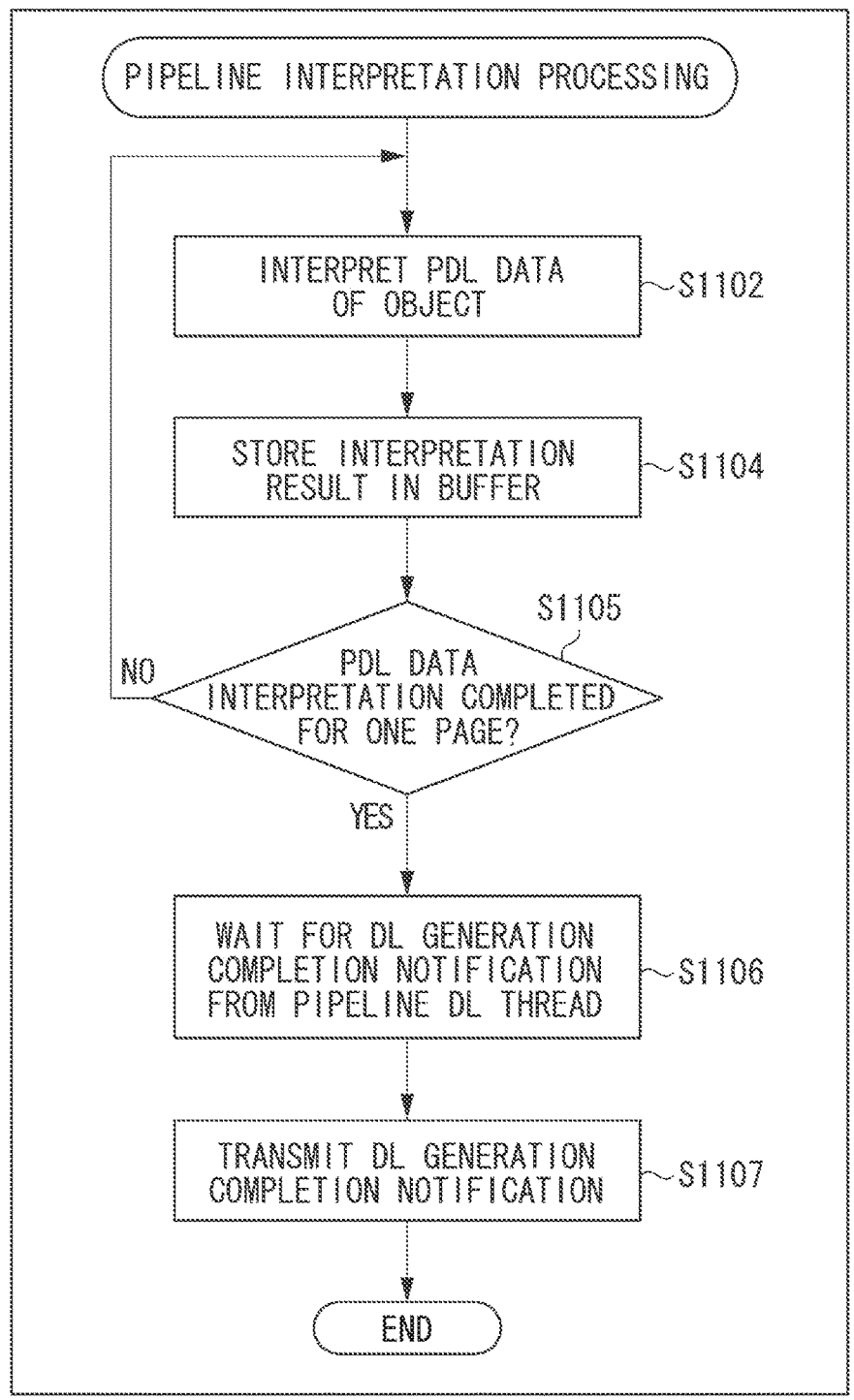
FIG. 5 is a flowchart illustrating processing performed by a pipeline page description language (PDL) thread.

The following describes the processing of the PDL data interpretation in pipeline parallel processing assigned to an empty thread based on the instruction in step S404, with reference to the flowchart illustrated in FIG. 5. By using as a trigger an instruction for an empty thread to function as a pipeline PDL thread, the processing of this flowchart is performed by the pipeline PDL thread. Therefore, the processing entity is the interpretation unit 201 serving as a pipeline PDL thread.

In step S1102, the interpretation unit 201 interprets the PDL data of an uninterpreted object included in the page with the DL generation target page number. This interpretation result is written out to the work memory area.

In step S1104, the interpretation unit 201 transmits the interpretation result that has been written out in step S1102, to the buffer 204. This transmission is performed upon reception of a transmission permission notification from the pipeline DL thread (described below). The transmitted interpretation result is processed by a pipeline DL thread as described below.

In step S1105, the interpretation unit 201 determine whether the PDL data interpretation is completed for all objects included in the page with the DL generation target page number. When the PDL data interpretation is completed for all objects (YES in step S1105), the processing proceeds to step S1106. On the other hand, when the PDL data interpretation is completed not for all objects (NO in step S1105), the processing returns to step S1102. In step S1102, the interpretation unit 201 interprets the PDL data of another uninterpreted object.

In step S1106, the interpretation unit 201 waits for a DL generation completion notification from the pipeline DL thread. The interpretation unit 201 acquires the memory address (described below) included in the DL generation completion notification. Upon reception of the DL generation completion notification, the processing proceeds to step S1107.

In step S1107, the interpretation unit 201 transmits the DL generation completion notification including the acquired memory address to the parallel control unit 200 which is implemented by a thread different from a pipeline PDL thread and a pipeline DL thread. The DL generation completion notification also includes the page number of the generated DL, and is received in step S406.

The above-described processing is performed by a pipeline PDL thread.

<Pipeline DL Thread>

Figure 6:
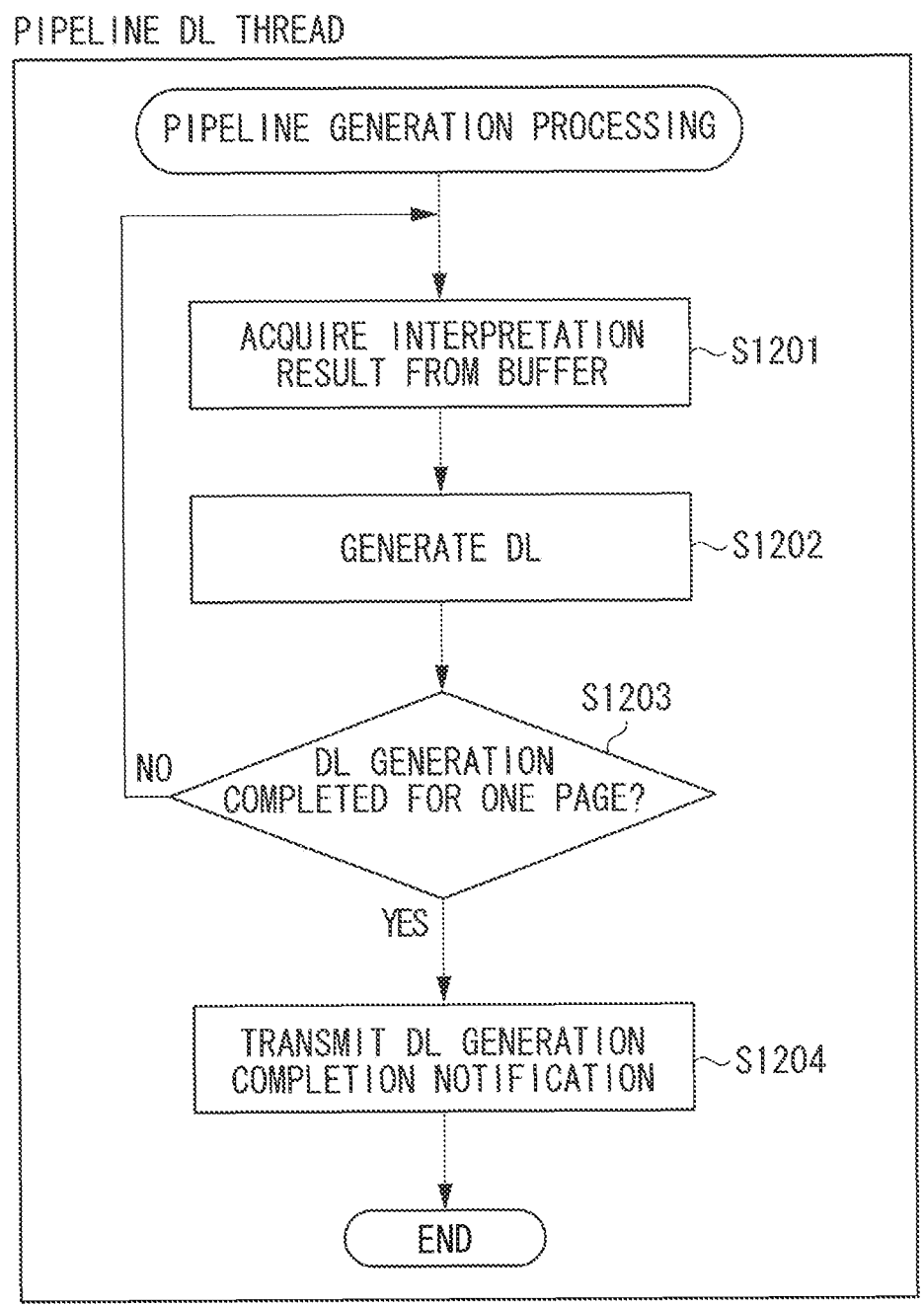
FIG. 6 is a flowchart illustrating processing performed by a pipeline display list (DL) thread.

The following describes the processing of the DL data generation in pipeline parallel processing assigned to an empty thread based on the instruction in step S404, with reference to the flowchart illustrated in FIG. 6. By using as a trigger an instruction for an empty thread to function as a pipeline DL thread, the processing of this flowchart is performed by the pipeline DL thread. Therefore, the processing entity is the generation unit 203 serving as a pipeline DL thread.

In step S1201, the generation unit 203 acquires the result of the PDL data interpretation for objects from the buffer 204.

In step S1202, the generation unit 203 generates a DL of the object based on the interpretation result acquired in step S1201. The generated DL is stored in the DL storage memory. The generation unit 203 transmits a transmission permission notification to the pipeline PDL thread. Thus, control is performed so that, after the interpretation result in the buffer 204 has been processed, the following interpretation result is overwritten to the buffer 204. When starting the DL generation for one page, the generation unit 203 allocates a memory area having the maximum value of the DL data size for one page in the DL storage memory, and sequentially stores the generated DL in the memory area. As described above, during the DL generation, the generation unit 203 determines whether the data size of the generated DL exceeds the maximum value of the DL data size for one page. When the maximum value is exceeded, the generation unit 203 performs the fall back processing.

In step S1203, the generation unit 203 determines whether the DL generation is completed for all objects included in the page with the DL generation target page number. When the DL generation is completed for all objects (YES in step S1203), the processing proceeds to step S1204. On the other hand, when the DL generation is not completed for all objects (NO in step S1203), the processing returns to step S1201. In step S1201, the generation unit 203 processes the interpretation result stored in the buffer 204.

In step S1204, the generation unit 203 transmits a DL generation completion notification to the pipeline PDL thread. The DL generation completion notification is received in step S1106. The DL generation completion notification also includes the memory address for storing the generated DL for one page.

The above-described processing is performed by a pipeline DL thread.

<Flow of Page Parallel DL Generation>

Figure 7:
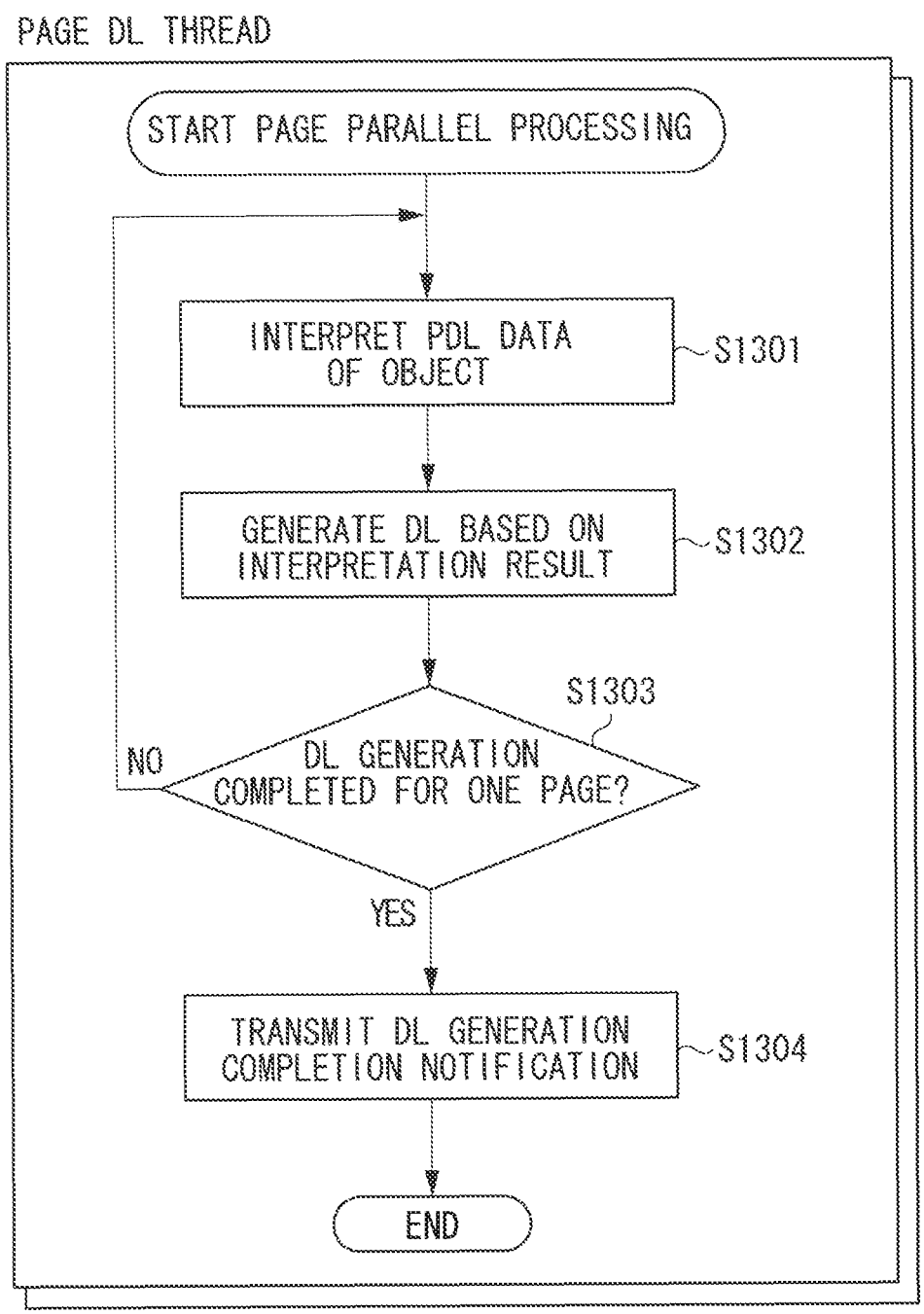
FIG. 7 is a flowchart illustrating processing performed by a page DL thread.

The following describes the processing of the DL data generation in page parallel processing assigned to an empty thread based on the instruction in step S412, with reference to the flowchart illustrated in FIG. 7. By using as a trigger an instruction for an empty thread to function as a page DL thread, the processing of this flowchart is performed by the page DL thread. Therefore, the processing entity is the interpretation unit 211 and the generation unit 213 serving as page DL threads.

In step S1301, the interpretation unit 211 interprets the PDL data of objects included in the page with the DL generation target page number, and writes out the interpretation result to the work memory.

In step S1302, the generation unit 213 reads the interpretation result written out to the work memory, and generates a DL of the object. The generated DL is stored in the DL storage memory. When starting the DL generation for one page, the generation unit 213 allocates a memory area having the maximum value of the DL data size for one page in the DL storage memory, and sequentially stores the generated DL in the memory area. As described above, during the DL generation, the generation unit 213 determines whether the data size of the generated DL exceeds the maximum value of the DL data size for one page. When the maximum value is exceeded, the generation unit 213 performs the fall back processing.

In step S1303, the generation unit 213 determines whether the DL generation is completed for all objects included in the page with the DL generation target page number. When the DL generation is completed for all objects (YES in step S1303), the processing proceeds to step S1304. On the other hand, when the DL generation is not completed for all pages (NO in step S1303), the processing returns to step S1301. In step S1301, the generation unit 213 interprets the PDL data of the following object.

In step S1304, the generation unit 213 transmits a DL generation completion notification to the parallel control unit 200. The DL generation completion notification includes the memory address for storing the generated DL for one page and the page number of the DL.

The above-described page DL thread is performed for respective pages by a plurality of threads, making it possible to efficiently perform the DL generation.

As described above, by switching between pipeline parallel processing and page parallel processing, it is possible to efficiently parallelize processing by a multi-core CPU both on the single-page PDL data and the multi-page PDL data.

Although the above-described processing is pipeline parallel processing, in short, it is meaningful to perform parallel processing also on the first page. For example, for the first page, the thread 1 may convert the first object included in the PDL data into a DL, and the thread 2 may convert the second object into a DL. However, in such object parallel processing, since the timing of completion of the DL generation for objects is different for each object, it is necessary to control the order of storing the generated DLs of objects.

In pipeline parallel processing, on the other hand, since a plurality of threads performs pipeline processing on one object, there is an advantage that it is not necessary to be conscious of the order of storing DLs of objects.

In the first exemplary embodiment, to acquire effects of multi-core-based (multi-threaded) parallel processing regardless of the number of pages of the PDL data received from an external apparatus, pipeline parallel processing is performed on the first page and page parallel processing is performed on the second and subsequent pages.

However, in some cases of a plurality of pages, performing page parallel processing from the first page provides larger effects of parallel processing. In particular, the PDL data of the even number of pages provides larger effects.

For example, in case of 2-page PDL data, performing the DL generation for the first and the second pages through page parallel processing provides larger effects of multi-threaded (multi-core-based) parallel processing.

In the present exemplary embodiment, a configuration for determining whether processing is to be performed with pipeline parallel processing or page parallel processing depending on the number of pages of the PDL data will be described below with reference to FIG. 8. In the following exemplary embodiment, redundant descriptions of elements identical to those in the first exemplary embodiment will be omitted.

Figure 4:
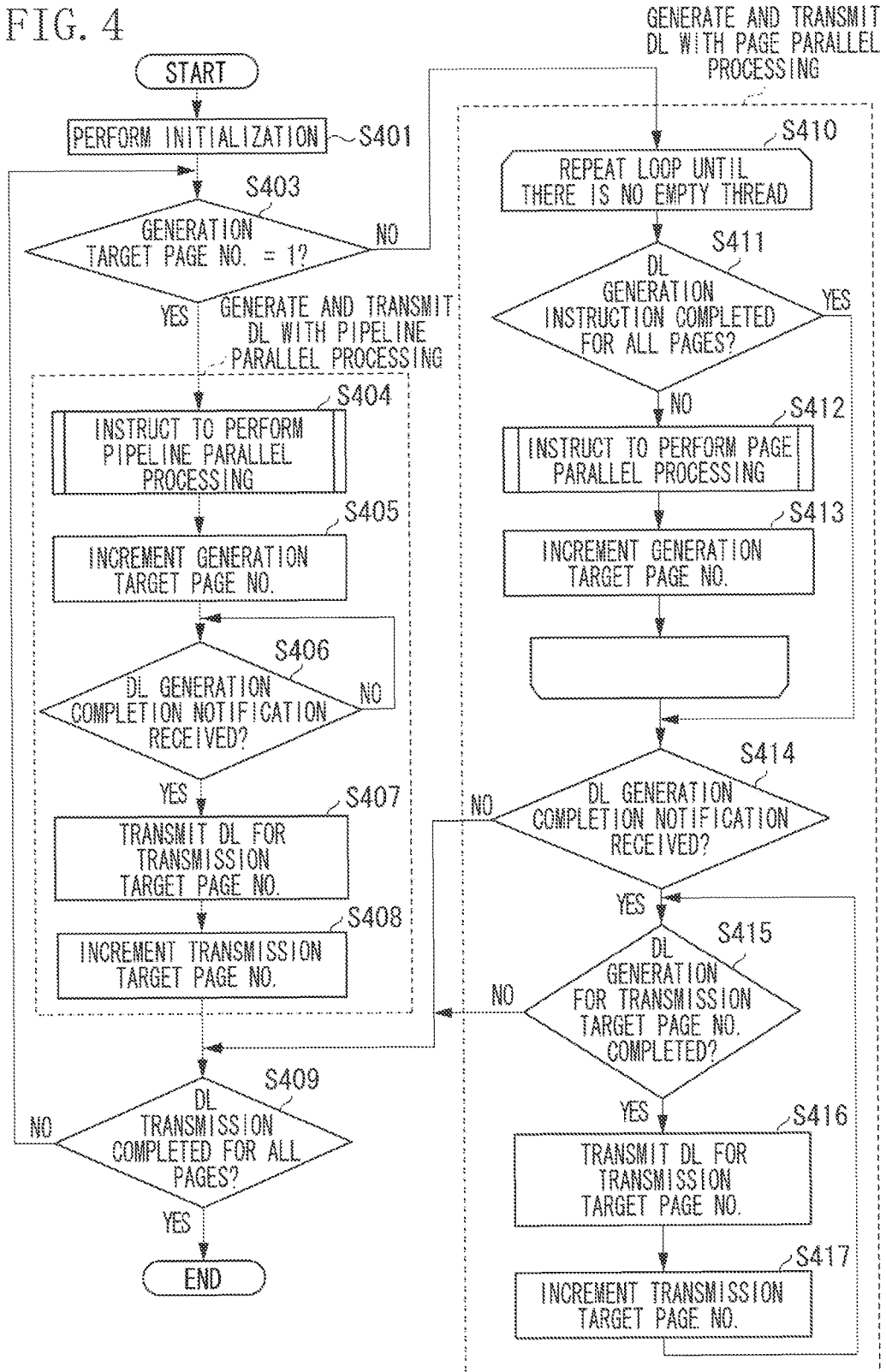
FIG. 4 is a flowchart illustrating control for selecting between pipeline parallel processing and page parallel processing according to a first exemplary embodiment.
Figure 8:
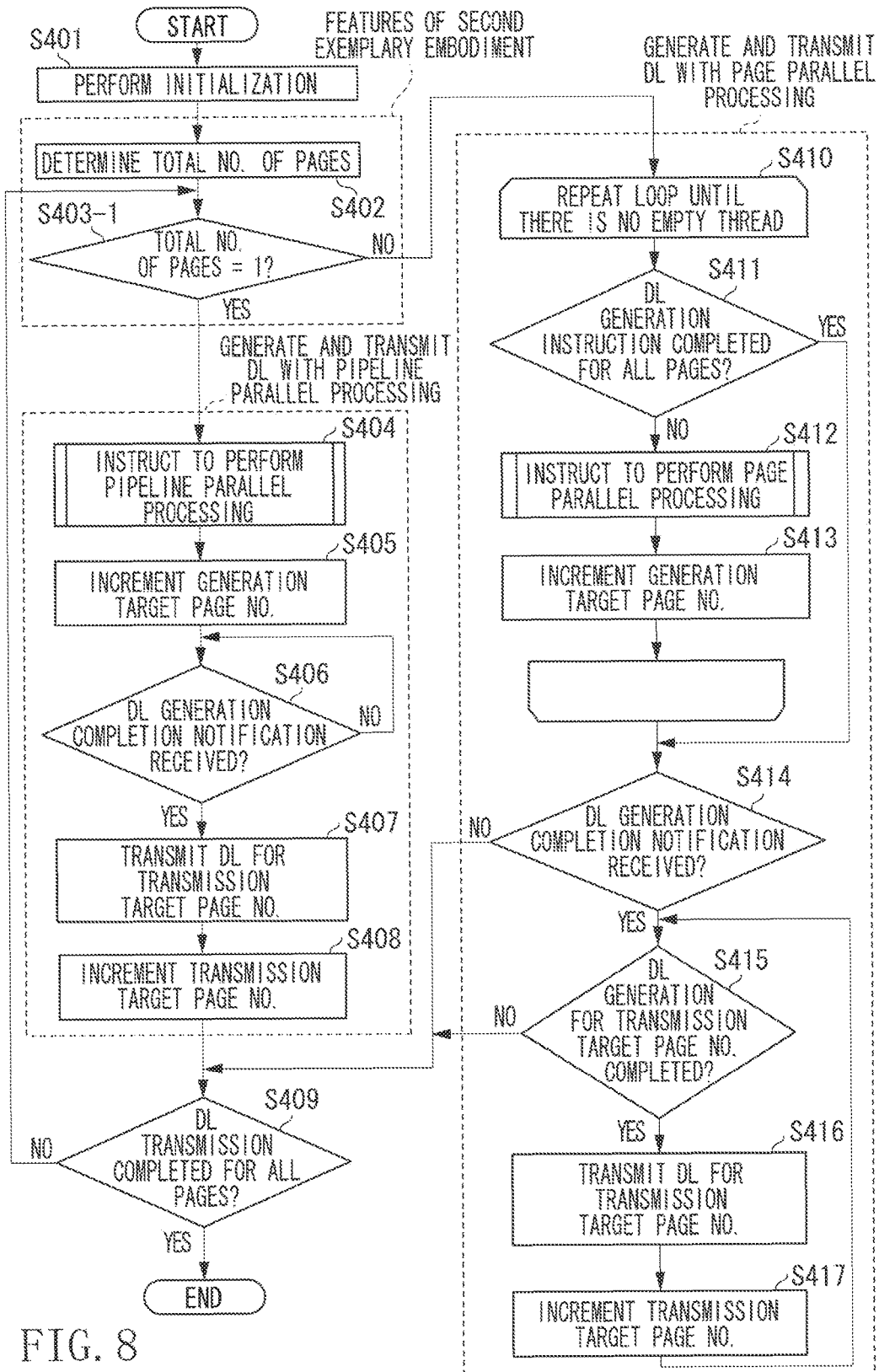
FIG. 8 is a flowchart illustrating control for switching between pipeline parallel processing and page parallel processing according to a second exemplary embodiment.

The flowchart illustrated in FIG. 8 differs from the flowchart illustrated in FIG. 4 according to the first exemplary embodiment in that the processing in step S402 is added and that the processing in step S403 is changed to step S403-1. Only these differences will be described below.

In step S402, the parallel control unit 200 interprets the PDL data to determine the total number of pages of the PDL data received from an external apparatus. An example of a method for determining the total number of pages will be described below.

For example, the parallel control unit 200 counts the total number of page break commands while sequentially reading the PDL data from the top to the end. Since a page break command indicates the end of a page, counting the total number of page break commands enables acquiring the total number of pages of the PDL data.

Alternatively, when the PDL data includes header information, the parallel control unit 200 reads the header information and, when the header information describes the total number of pages of the PDL data, acquires the total number of pages.

Alternatively, the parallel control unit 200 may determine the PDL type of the PDL data and determine the total number of pages based on the PDL type. For example, when the PDL type is Joint Photographic Experts Group (JPEG), Tag Image File Format (TIFF), or the like indicating a single-page image, it is desirable to perform pipeline parallel processing instead of page parallel processing. Therefore, when the PDL type is JPEG, TIFF, or the like, the parallel control unit 200 determines the total number of pages as 1.

In step S403-1, based on the total number of pages determined in step S402, the parallel control unit 200 determines whether the total number of pages is 1. When the total number of pages is 1 (YES in step S403-1), the processing proceeds to step S404. On the other hand, when the total number of pages is more than 1 (NO in step S403-1), the processing proceeds to step S410.

As described above, when the single-page PDL data is assumed, the parallel control unit 200 performs pipeline parallel processing on the first page. When the multi-page PDL data is assumed, the parallel control unit 200 performs page parallel processing on the first page in parallel with the second page. This enables improving effects of parallel processing.

(Other Exemplary Embodiment)

Although, in the above-described exemplary embodiment, pipeline parallel processing is performed only on the first page (starting page) of the PDL data, pipeline parallel processing may also be performed on the last page of the PDL data.

Although, in the above-described exemplary embodiment, pipeline parallel processing or page parallel processing is suitably selected in the case of the DL generation based on the PDL data, a similar concept is also applicable to the raster image generation based on the PDL data.

Although, in the image forming apparatus according to the above-described exemplary embodiment, one RIP (RIP 106) sequentially performs the DL rasterization on a page basis, a plurality of RIPs may be employed instead of the RIP 106. As an example, a plurality of RIPs may parallelly perform the DL rasterization for different areas in the same page based on a generated DL. For example, a first RIP rasterizes the first band area of a generated page by using the DL of the relevant page, and, in parallel with the DL rasterization by the first RIP, a second RIP rasterizes the second band of the relevant page by using the DL of the relevant page. Performing processing in this way enables recovering the delay due to the suspended DL generation through the processing speed improvement for the parallel rasterization of pages.

As another example, a plurality of RIPs may parallelly perform the DL rasterization for respective different pages. For example, the first RIP performs the DL rasterization for the preceding page, and the second RIP performs the DL rasterization for the following page in parallel with the DL rasterization by the first RIP. Even in such a configuration, if the DL generation for the following page is completed before the DL generation for the preceding page, the parallel control unit 200 delays the rasterization of the DL of the following page which has been generated before the DL of the preceding page, similar to the above-described exemplary embodiment. However, in this configuration, the first and the second RIPs start the DL rasterization for the preceding and the following pages not upon completion of the DL rasterization for the preceding page but upon completion of the DL generation for the preceding page. Performing processing in this way enables correcting the page order in the DL generation and acquiring effects of the rasterization speed improvement through parallel rasterization. In this parallel rasterization, if the DL rasterization of the following page is completed before the DL rasterization for the preceding page, the parallel control unit 200 instructs the second RIP to hold the raster image for the one following page to suspend the DL rasterization for the further following page. Then, upon completion of the DL rasterization for the preceding page by the first RIP, the first RIP transmits the raster image of the preceding page to the printer engine 108, and the second RIP subsequently transmits the raster image of the following page to the printer engine 108. With this configuration, even if the order of the DL generation for page is reversed, it is possible to acquire effects of the rasterization speed improvement through parallel rasterization while restraining the continuous storage of raster images of a plurality of pages, thus achieving printing in the correct order of pages.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093537, filed Apr. 30, 2015, and No. 2016-032473, filed Feb. 23, 2016, which are hereby incorporated by reference herein in its entirety.

What is claimed is:

1. An image forming apparatus comprising:
a printer engine configured to print rasterized pages; and at least one controller having one or more processors executing programs stored in a memory, the at least one controller being configured to function as:
a receiving unit configured to receive PDL data including a plurality of pages;
a plurality of processing units configured to generate, on a page basis, intermediate data of the plurality of pages based on the PDL data; and
a rasterizing unit configured to rasterize the intermediate data of the plurality of pages generated by the plurality of processing units;
wherein, in a case where generation of intermediate data of a following page is completed before generation of intermediate data of a preceding page, a second rasterization of the intermediate data of the following page by the rasterizing unit is controlled so that the second rasterization of the intermediate data of the following page is delayed until a first rasterization of the intermediate data of the preceding page is completed, and the second rasterization of the intermediate data of the following page by the rasterizing unit is executed after the first rasterization of the intermediate data of the preceding page is completed,
wherein, a first raster image generated by the first rasterization is printed on a first sheet and a second raster image generated by the second rasterization is printed on a second sheet which is different from the first sheet.

2. The image forming apparatus according to claim 1, wherein, in the case where the generation of the intermediate data of the following page is completed before the generation of the intermediate data of the preceding page, the rasterizing unit suspends the rasterization of the intermediate data of the following page, and, before the rasterization of the intermediate data of the following page, completes the rasterization of the intermediate data of the preceding page which has been generated after the intermediate data of the following page.

3. The image forming apparatus according to claim 1, wherein the plurality of processing units generates intermediate data of respective different pages.

4. The image forming apparatus according to claim 1, further comprising a management unit configured to manage a page number, intermediate data of a page with the page number being to be rasterized by the rasterizing unit, wherein, in a case where the generation of the intermediate data of the following page is completed before a generation of the intermediate data of the page with the page number managed by the management unit, the rasterizing unit delays the rasterization of the intermediate data of the following page till completion of a generation and a rasterization of intermediate data of each of pages from the page with the page number to a page immediately before the following page.

5. The image forming apparatus according to claim 1, further comprising a memory area having a predetermined data size, configured to store the intermediate data of respective pages generated by the plurality of processing units, wherein at least one of the plurality of processing units is controlled to suspend a generation of intermediate data of remaining pages based on a free capacity of the memory area.

6. The image forming apparatus according to claim 5, wherein, in a case where the free capacity of the memory area is smaller than a threshold value, the at least one processing unit is controlled to suspend the generation of the intermediate data of the remaining pages.

7. The image forming apparatus according to claim 1, wherein at least one of the processing units is controlled to suspend a generation of intermediate data of remaining pages based on an amount of unrasterized intermediate data out of generated intermediate data of pages.

8. The image forming apparatus according to claim 7, wherein the amount is a total size of the unrasterized intermediate data out of the generated intermediate data of the pages or a number of pages of the unrasterized intermediate data out of the generated intermediate data of the pages, and
wherein, in a case where the amount is equal to or greater than a threshold value, the at least one processing unit is controlled to suspend the generation of the intermediate data of the remaining pages.

9. The image forming apparatus according to claim 1, wherein the rasterization unit comprises:
a first unit configured to perform, by using intermediate data of one page, a rasterization for a first area in the page; and
a second unit configured to perform, by using the intermediate data, a rasterization for a second area in the page, different from the first area in parallel with the rasterization for the first area.

10. The image forming apparatus according to claim 1, wherein the rasterization unit comprises:
a first unit configured to perform, by using intermediate data of a first page, a rasterization for the first page; and
a second unit configured to perform, by using intermediate data of a second page different from the first page, a rasterization for the second page in parallel with the rasterization for the first page.

11. The image forming apparatus according to claim 1, wherein, when generating intermediate data based on the PDL data on a page basis, the plurality of processing units performs:
parallelly generating, for a predetermined page of the PDL data, intermediate data of objects included in the page by using a plurality of the processing units; and
parallelly generating, for a page other than the predetermined page, intermediate data of objects included in the page by using a different processing unit on a page basis.

12. The image forming apparatus according to claim 11, wherein, for the predetermined page, one of the plurality of processing units interprets PDL data of objects included in the page, and
wherein, for the predetermined page, another one of the plurality of processing units generates intermediate data of the objects based on an interpretation result.

13. The image forming apparatus according to claim 12, wherein, for the predetermined page, the one processing unit transmits the interpretation result to a buffer from a memory in which the interpretation result is stored, and
wherein, for the predetermined page, the another processing unit acquires the interpretation result transmitted to the buffer, and generates the intermediate data.

14. The image forming apparatus according to claim 13, wherein, for the page other than the predetermined page, the one processing unit interprets PDL data of objects included in a certain page, and generates intermediate data of the objects based on an interpretation result, and
wherein, for the page other than the predetermined page, the another processing unit interprets PDL data of objects included in another page, and generates intermediate data of the objects based on an interpretation result.

15. The image forming apparatus according to claim 14, wherein, for the page other than the predetermined page, the one processing unit acquires the interpretation result without the transmission from the memory in which the interpretation result is stored, and generates the intermediate data.

16. The image forming apparatus according to claim 11, wherein, in a case where a total number of pages of the received PDL data is determined to be one, the plurality of processing units handles all pages included in the PDL data as the predetermined page.

17. The image forming apparatus according to claim 11, wherein, in a case where a total number of pages of the received PDL data is determined to be more than one, the plurality of processing units handles all pages included in the PDL data as the page other than the predetermined page.

18. The image forming apparatus according to claim 16, wherein the total number of pages is acquired upon interruption of the received PDL data.

19. The image forming apparatus according to claim 16, wherein the total number of pages is regarded as one upon determination of a PDL type of the received PDL data.

20. The image forming apparatus according to claim 11, further comprising a determination unit configured to determine whether to handle all pages included in the PDL data as the predetermined page or as the page other than the predetermined page, based on a PDL type of the received PDL data.

21. The image forming apparatus according to claim 11, wherein the predetermined page is a starting page of the PDL data.

22. A method for controlling an image forming apparatus having a plurality of processing units, the method comprising:
receiving PDL data including a plurality of pages;
controlling the plurality of respective different processing units to generate, on a page basis, intermediate data of the plurality of pages based on the PDL data;
rasterizing, on a page basis, the generated intermediate data of the plurality of pages; and
printing the rasterized pages by using a printer engine,
wherein, in a case where a generation of intermediate data of a following page is completed before a generation of intermediate data of a preceding page, the controlling delays a second rasterization of the intermediate data of the following page by the rasterizing until a second rasterization of the intermediate data of the preceding page is completed, and the second rasterization of the intermediate data of the following page by the rasterizing step is executed after a first rasterization of the intermediate data of the preceding page is completed,
wherein, a first raster image generated by the first rasterization is printed on a first sheet and a second raster image generated by the second rasterization is printed on a second sheet which is different from the first sheet.

* * * * *